US008284096B2

(12) United States Patent
Martinez Godoy et al.

(10) Patent No.: US 8,284,096 B2
(45) Date of Patent: Oct. 9, 2012

(54) SYSTEM AND METHOD OF DETECTION OF UNCRUSHABLE METALLIC PIECES IN MINERAL LOADS

(75) Inventors: Gastón Guillermo Martinez Godoy, Santiago (CL); Pedro Daniel Pedraza Segovia, Santiago (CL); Miguel Jesús Calderon Maldonado, Santiago (CL)

(73) Assignee: Technologia Integral S.A., Santiago (CL)

( * ) Notice: Subject to any disclaimer, the term of this patent is extended or adjusted under 35 U.S.C. 154(b) by 278 days.

(21) Appl. No.: 12/879,063

(22) Filed: Sep. 10, 2010

(65) Prior Publication Data

US 2011/0074619 A1 Mar. 31, 2011

(30) Foreign Application Priority Data

Sep. 30, 2009 (CL) ................................. 1924-2009

(51) Int. Cl.
*G01S 13/00* (2006.01)
(52) U.S. Cl. ........................................................ 342/22
(58) Field of Classification Search .................... 342/22
See application file for complete search history.

(56) References Cited

U.S. PATENT DOCUMENTS

| 1,729,095 | A |  | 9/1929 | Crist |  |
|---|---|---|---|---|---|
| 3,966,590 | A |  | 6/1976 | Boom et al. |  |
| 2009/0161825 | A1 | * | 6/2009 | Carver et al. | 378/57 |
| 2010/0005044 | A1 | * | 1/2010 | Bowring et al. | 706/20 |

OTHER PUBLICATIONS

H. Salamanco et al., System for Detecting and Reporting the Loss of an Adapter from the Dippers of Mining Extraction Machinery, HighService Industrial Support Company, (www.highservice.cl), Apr. 2008.
Luo et al., Missing Tooth Detection with Laser Range Sensing, Proceedings of the 5th World Congress on Intelligent Control and Automation, Jun. 15-19, 2004, Hangzhou, P.R. China.

* cited by examiner

*Primary Examiner* — Timothy A Brainard
(74) *Attorney, Agent, or Firm* — Carlson, Gaskey & Olds, P.C.

(57) ABSTRACT

A system and method to detect uncrushable metallic pieces hidden inside a mineral load directly inside a transport device to a primary crusher includes a directionally adjustable radar having at least one device with electromagnetic wave emitter/receiver antennas, a portal through which the transport device passes, a spectral generator/analyzer connected to the antenna devices that generates the electromagnetic waves and analyzes the echoes of the electromagnetic waves that interact with the mineral load, and a computational device that includes a digital signal processor connected to the spectral generator/analyzer.

7 Claims, 2 Drawing Sheets

SYSTEM AND METHOD OF DETECTION OF UNCRUSHABLE METALLIC PIECES IN MINERAL LOADS

REFERENCE TO RELATED APPLICATIONS

This application claims priority to Chilean Application No. CL No. 1924-2009 filed Sep. 30, 2009.

FIELD OF THE INVENTION

The present invention is related to the mining industry, and is especially directed to preventing the entrance of metallic pieces into crushers that are able to jam the operation thereof. In particular, the present invention includes a system and a method to detect uncrushable metallic pieces hidden in mineral loads transported by transport devices, such as mining dump trucks or train dumping cars that go to primary crushers.

BACKGROUND OF THE INVENTION

Mineral from a mine has a varied granulometry, with particle sizes ranging from less than 1 mm to fragments larger than 1 m in diameter, and therefore the object of crushing is to reduce the fragment size to obtain a uniform size in which usually 100% is under eight inches in diameter.

Crushers are large electric equipments specialized in crushing the mineral rocks. Transport devices discharge the mineral in the top section of these crushers; while the crushed mineral is collected in the bottom discharge, 100% of them being under 20 cm (8 inches), which is sent downstream to a concentrator to be subjected to a grinding process.

When an uncrushable element enters into the crusher, the crusher will not be able to triturate said element, and this will cause a mechanical jam that will force the crusher to be stopped, and so all the mineral discharge and crushing process must also be stopped.

This problem has no direct solution. Usually, a traditional solution to detect metallic pieces, if they include ferromagnetic metals, is to set up an electromagnet over a conveyor belt that carries the material to be processed. For example, Zhengzhou Jinding Heavy Industry Co. Ltd. supplies equipment for the mining industry, metallurgy and any other processes, in which easily attractable ferromagnetic materials can be detected; in these cases, the equipment is installed over the conveyor belts that transport the material and a magnet attracts the metallic pieces and drags them to a waste storage deposit. Other models are also available (Zhengzhou Jinding Heavy Industry Co., Ltd), known as magnetic ore separators, and some of them are protected by patents, such as the U.S. Pat. No. 3,966,590—Magnetic ore separator and U.S. Pat. No. 1,729,095—Electromagnetic ore separator. However, these solutions cannot be applied to any transport devices that transports materials to primary crushers, since in some cases mineral rocks and rock fragments are loaded in especially reinforced large capacity mining dumper trucks or train cars. Additionally, many metallic pieces are made of austenitic steel and therefore cannot be removed by electromagnets.

Currently, solutions to minimize this problem have been designed, based in the use of video cameras to detect the fall of teeth of a mechanical shovel that loads a mineral transport truck.

Variants of the same solution incorporate lasers to illuminate the inspection zone monitored by the video cameras, with additional mobile elements to carry out the laser scan or using a line projecting laser. These devices operate in the visible or near infrared (NIR) range and present a low degree of efficacy because of the environmental contamination by dust, which have a particle size in the range of the emission wavelength of the lasers. The company HighService discloses in its website (http://www.highservice.cl, Sep. 30, 2009) a system of this type to prevent mechanical shovel hopper teeth and/or adapters to damage primary crushers and cause production losses. The system detects these materials through digital image processing, wherein the scene is illuminated by a line laser operating in the near infrared spectrum. The operator cabin interface automatically informs the operator if the fall of a tooth or adapter is detected, the operator checks the hopper and then confirms the event.

Other applications use the Laser Range Sensing (LRS) technology to construct a 3D image from the signals, which is compared to the CAD design of the shovel onto which the equipment is installed. If differences are detected, an alert signal is delivered to the shovel operator. An experiment was published in 2004, using a prototype to detect the loss of teeth of extracting mechanical shovels by means of a laser (Laser Rangefinder AR4000, manufactured by Acuity Research) (X. Luo, H, Zhang: Missing tooth detection with laser range sensing, Proceedings of the 5th World Congress on Intelligent Control and Automation, Jun. 15-19, 2004, China).

The detection systems of the previous art, based in digital image processing, i.e., optical systems, are oriented to detect the fall of teeth from a mechanical shovel that loads a mineral transport truck, but these systems have a number of inconveniences. The detection systems must be installed onto the shovel, which requires one optical system per shovel, the detection systems have a low detection efficiency because the optical components of the systems can be contaminated by environmental dust and become blind, and the detection systems require complementary illumination equipments because they do not operate with low illumination levels.

All these applications aim to solve the problem installing a detection system right on the shovel. However, even when the fall of an teeth element of the shovel is detected, the exact falling location of said element is not known, which forces the transport device to be put off track and to deposit the load in other location, with no indication whether the uncrushable element has been lost in the process or not. Furthermore, there are other metallic pieces coming from other process operations which are hidden among the load material and can likewise arrive to the crusher.

One of the most important operations in a mining operation is primary crushing. After extraction, the mineral is transported to the crushers using the transport device, typically large capacity trucks or cargo train cars. During operation, it is not unusual that an uncrushable metal piece, e.g., a tooth of the shovel that loads the transport device, is transported together with the mineral load.

The entrance of a hard element into a primary crusher can cause, depending on its size, a jam and a subsequent unscheduled stop of the crushing equipment for several hours, which brings along production losses and generates maintenance and repair costs. To solve this problem, the presence of uncrushable elements in the mineral must be detected in good timing (before the mineral is discharged into the primary crusher).

One part of the efforts to solve the problem has been oriented to prevent certain types of uncrushable elements, such as shovel teeth, to enter into the primary crusher, using video cameras and image processing technology, lasers combined with image processing, etc., which are technologies oriented to detect the fall of a tooth or adapter into a shovel. However, there have been cases in which, even though the fall of a shovel tooth has been detected, the tooth was found in the crusher several hours later. The previous problem is aggravated by the fact that diverse uncrushable metallic pieces (perforation tricones, steel bars and other metal pieces), coming from other stages of the mineral extraction process, have also been found in crushers.

SUMMARY OF THE INVENTION

The present invention is directed to solve the technical problem of the detection of uncrushable metallic pieces hidden inside a load of mineral rocks directly inside a transport device, such as hoppers of large capacity mining trucks or train cars, that is delivered to a primary crusher, independently from the origin of the uncrushable element hidden inside the load that can interrupt the operation or jam the primary crushers.

The present invention consists in a system and a method to detect uncrushable metallic pieces hidden inside a mineral load directly inside the transport device that delivers the load into a primary crusher.

The present invention comprises a scanner formed by a directionally adjustable radar that comprises electromagnetic wave emitter/receiver antennas and spectrum generators/analyzers, which allows analyzing the mineral load in a frequency range and detecting electromagnetic wave echoes, particularly those echoes that characterize the presence of a metallic material and determines the presence of a given metallic material in said mineral load. The scanner is installed in a portal through which the transport device that transports the load passes.

The present invention allows the timely detection of the presence of an uncrushable metallic piece in the mineral load destined to a primary crusher, directly inside the transport device of the mineral load, independently from the origin of the undesired metallic piece hidden inside the load, in such a way as to discharge the mineral load in other location and to avoid causing problems in the primary crusher. In this way, primary crusher failures and undesired stops caused by the entrance of uncrushable materials are effectively avoided, which allows getting high yields from these crushers and decreasing their maintenance costs.

DETAILED DESCRIPTION OF THE INVENTION

Figure 1:
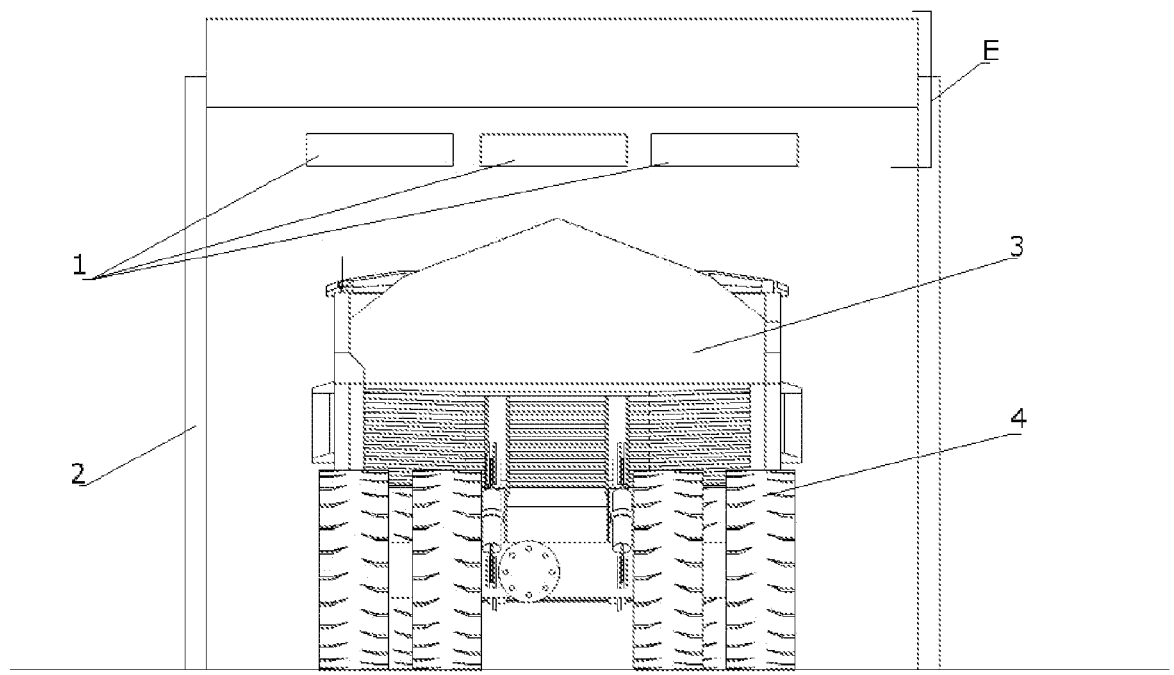
FIG. 1 represents schematically a front view of a system according to a first embodiment of the present invention with a large capacity truck.

As shown in FIG. 1, a system of the present invention to detect uncrushable metallic pieces hidden inside a mineral load 3 directly inside a transport device 4 (such as a vehicle) that delivers the load into a primary crusher includes a directionally adjustable radar E that has at least one device with electromagnetic wave emitter/receiver antennas 1 which are used to scan the mineral load 3 that is transported by the transport device 4. The system also includes a portal 2 through which the transport device 4 passes, with a top section where at least one antenna device 1 is located to face the mineral load 3 of the transport device 4 and at least one spectral generator/analyzer (not shown) connected to the antenna devices 1 that generates the electromagnetic waves and analyzes the echoes of the electromagnetic waves that interact with the mineral load 3, distinguishing the characteristic echo produced by a metallic element hidden inside the mineral load 3. The system also includes a computational device that includes a digital signal processor connected to the spectral generator/analyzer that is configured as a control, data processing and information display device that allows configuring the frequency range, integration time and number of activated antenna devices to allow data to be stored in its temporal or frequency domain for further processing and to deliver information regarding the transport device 4 check results to the user.

Figure 2:
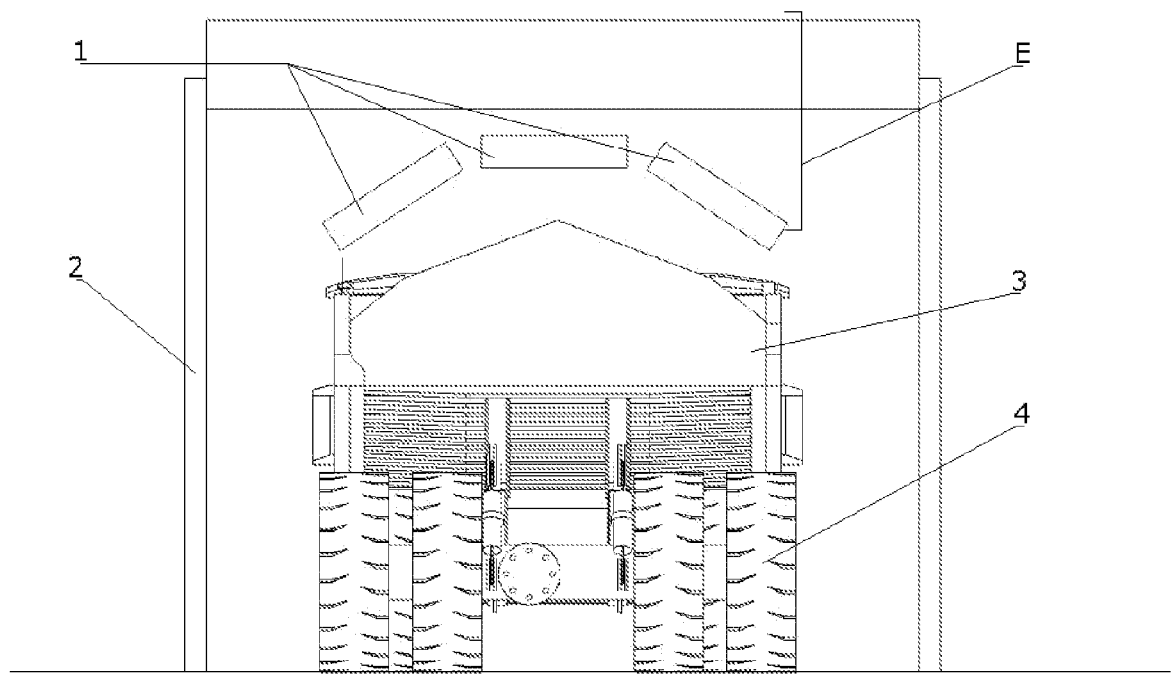
FIG. 2 represents schematically a front view of the system according to a second embodiment of the present invention with a large capacity truck.

As shown in FIG. 2, the system of the present invention additionally includes an automated electromechanical feature (not shown) to mechanically position the antenna devices 1 close to the mineral load 3 transported by the transport device 4, locating the antennas at a distance ranging from 20 to 100 centimeters with respect to the surface of the mineral load 3.

Particularly, the emitter/receiver antennas are arrays of multiple bow-tie monopole pair-like antenna elements with air coupling and electronic scan in the range from 30 to 3,000 megahertz and emission power ranging from 0.4 to 2 milliwatts, which are used to scan the mineral load 3 transported by the transport device 4. The separation between antenna elements is determined by the dimensions of the metallic element to be detected.

The spectral generator/analyzer (not shown), in connection with the antenna devices 1, generates electromagnetic waves in the frequency range from 30 to 3,000 megahertz. The generator/analyzer uses the digital frequencies principle instead of the typical phase-locked loop technology, which allows generating electromagnetic waves ranging from 30 megahertz to 3,000 megahertz in a large number of frequency steps. The spectral generator/analyzer performs a transformation on the temporal domain using a Fast Fourier Transform and this allows checking each antenna device 1 separately.

The digital signal processor basically includes a computer or portable computer with a Windows® or Linux® operating system, to control the spectral generator/analyzer through an Ethernet connection, which is configured to control, process data and display information.

The function of the adjustable radar scanner (E) is based on the Ground Penetration Radar (GPR) technology, which is a technique mainly developed to detect objects under Earth's surface. The electromagnetic wave radiated from an emitter antenna traverses the material at a speed determined by the material permittivity. The wave widens out and travels until reaching an object with electric properties that are different from those of the surrounding environment, is dispersed by the object and is detected by a receiver antenna. The intensity of the bounces varies significantly with the frequency, which can be characterized with a spectral reflection curve that contains information regarding the type of elements that can be found in the radar scanning zone.

The method of the present invention to detect uncrushable metallic pieces hidden inside a mineral load 3 directly inside a transport device 4 that delivers the load into a primary crusher, using an adjustable radar scanner E located in a portal 2, includes the steps of passing the transport device 4 through the portal 2 at a speed from 5 to 50 km/h, detecting when the mineral load 3 is under the portal 2, activating the adjustable radar scanner E, and generating controlled electromagnetic pulses that penetrate the mineral load 3 using an array of emitter antennas of the scanner. The method further includes the steps of detecting the echoes generated by the mineral load 3, the transport device 4 and the eventual uncrushable elements hidden inside the mineral load 3 using an array of electromagnetic wave receiver antennas, analyzing the information from the electromagnetic wave receiver antennas through spectral analyzers, sending the analyzed information to a digital processor to generate a sample consisting in an "image" of a cross-section of the mineral load 3, and repeating the steps of generating control electromagnetic pulses to sending the analyzed information to the digital process as the transport device 4 passes through the portal 2, generating a tomographic image of all the mineral load 3 in the transport device 4.

Each sample that generates a cross-sectional "image" of the mineral load 3 is processed in milliseconds and the following sample is immediately obtained by repeating the steps of the steps of generating control electromagnetic pulses to sending the analyzed information to the digital process, and so, when the transport device 4, e.g., a mining truck, ends passing through the portal 2, the method of the present invention generates a tomographic image of all the mineral load 3.

The tomographic image is formed from the reflections of electromagnetic waves on the different interfaces, characterized by a sudden change of the refractivity index of the material and by the reflection of the electromagnetic waves when they fall on the transport device 4, e.g., the hopper of a dumper truck. It is foreseeable that the spectral reflection curve will be very complex, due to the expected characteristics of the mineral load 3 on the transport device 4 and to the very diverse geometry of the metallic objects that can be found hidden inside the mineral load 3. The spectral curve is analyzed with a spectrum analyzer. The result delivered by the analyzer is digitally processed by a digital signal processing means that comprises a computer, a portable computer or the like, configured in a Windows® or Linux® environment, wherein the information is stored and the information that will be finally delivered to the operator and/or driver of the transport device 4 is displayed.

The method of the present invention comprises generating a signal when the uncrushable metallic piece is detected, informing the operator and/or the driver of the transport device 4 that the mineral load 3 of the transport means contains the uncrushable metallic piece and that the mineral load 3 should be directed to another location, using a traffic light or the like.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A system to detect uncrushable metallic pieces hidden inside a mineral load directly inside a transport device to a primary crusher, the system comprising:
  a directionally adjustable radar that includes at least one device having electromagnetic wave emitter/receiver antennas used to scan a mineral load that is transported by the transport device;
  a portal through which the transport device passes, with a top section where at least one antenna device is located to face the mineral load of the transport device;
  a spectral generator/analyzer connected to the antenna devices that generates electromagnetic waves and analyzes the echoes of the electromagnetic waves that interact with the mineral load, distinguishing a characteristic echo produced by a metallic element hidden inside the mineral load; and
  a computational device that includes a digital signal processor connected to the spectral generator/analyzer to allow data to be stored in its temporal or frequency domain for further processing and to deliver information regarding the transport device check results to the user.

2. The system according to claim 1, wherein the system additionally includes an automatically controlled electromechanical feature to mechanically position the antenna devices close to the mineral load transported by the transport device, locating the antennas at a distance ranging from 20 to 100 centimeters with respect to a surface of the mineral load.

3. The system according to claim 1, wherein the emitter/receiver antennas are arrays formed by multiple emitter/receiver pairs of antenna elements, with each emitter/receiver pair formed by bow-tie monopole pair-like elements with air coupling and electronic scan in the range from 30 to 3,000 megahertz and emission power ranging from 0.4 to 2 milliwatts, which are used to scan the mineral load transported by the transport device.

4. The system according to claim 1, wherein the spectral generator/analyzer connected to the antenna devices generates electromagnetic waves in a frequency range from 30 to 3,000 megahertz and performs a transformation of the temporal domain using a Fast Fourier Transform that allows checking each antenna device separately.

5. A method to detect uncrushable metallic pieces hidden inside a mineral load directly inside a transport device that delivers the load into a primary crusher using an adjustable radar scanner located in a portal, the method comprising the steps of:
  a) passing a transport device through a portal at a speed from 5 to 50 km/h;
  b) detecting when a mineral load is under the portal;
  c) activating an adjustable radar scanner;
  d) generating controlled electromagnetic pulses that penetrate the mineral load using an array of emitter antennas of the scanner;
  e) detecting echoes generated by the mineral load, the transport device and eventual uncrushable elements hidden inside the mineral load using an array of electromagnetic wave receiver antennas;
  f) analyzing the resulting information from said electromagnetic wave receivers through spectral analyzers;
  g) sending the analyzed information to a digital processor to generate a sample consisting in an "image" of a cross-section of the mineral load; and
  h) repeating said steps d) to g) as the transport device passes through the portal, generating a tomographic image of all the mineral load in the transport device.

6. The method according to claim 5, including the steps of generating a signal when the uncrushable metallic piece is detected to inform the operator and/or the driver of the transport device that the mineral load of the transport device contains the uncrushable metallic piece and that the mineral load should be directed to another location.

7. The method according to claim 6, wherein the step of generating the signal is performed using a traffic light.

\* \* \* \* \*